United States Patent
Uffner

[11] 3,755,009
[45] Aug. 28, 1973

[54] GLASS FIBER REINFORCED ELASTOMERS

[75] Inventor: William E. Uffner, Newark, Ohio

[73] Assignee: Owens-Corning Fiberglas Corporation, Toledo, Ohio

[22] Filed: May 6, 1971

[21] Appl. No.: 140,768

[52] U.S. Cl. 117/126 GB, 117/161 UH, 117/161 UT
[51] Int. Cl. ............................................. C03c 25/02
[58] Field of Search............................. 117/126 GB

[56] References Cited
UNITED STATES PATENTS
3,620,701  11/1971  Janetos et al............... 117/126 GB
3,567,671  3/1971  Janetos et al............... 117/126 GB

*Primary Examiner*—William D. Martin
*Assistant Examiner*—William H. Schmidt
*Attorney*—Staelin & Overman

[57] ABSTRACT

This invention is addressed to the improvement in the bonding relationship between glass fibers and elastomeric materials in the manufacture of glass fiber reinforced elastomeric products wherein individual glass fibers are coated, or bundles of glass fibers are impregnated with a polymer blend composition comprising an acrylonitrile-butadiene-styrene terpolymer, a copolymer of vinyl chloride and vinylidene chloride and a terpolymer of butadiene-styrene-vinyl pyridine.

11 Claims, 4 Drawing Figures

Patented Aug. 28, 1973 3,755,009
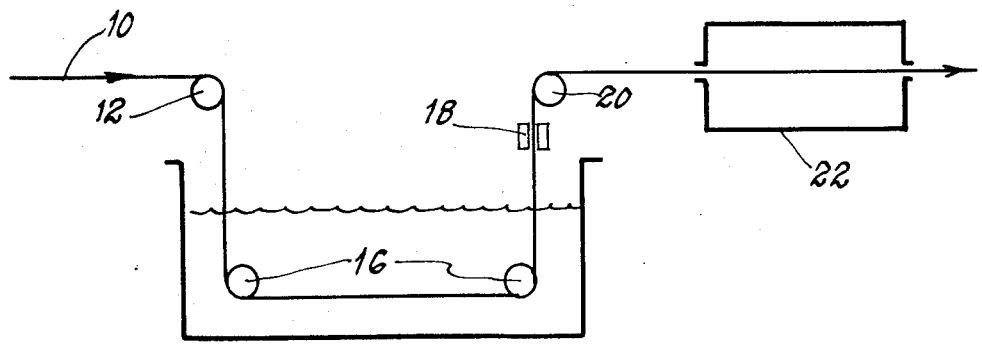
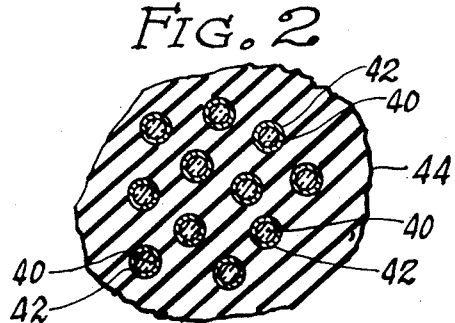
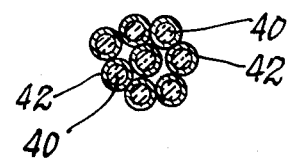
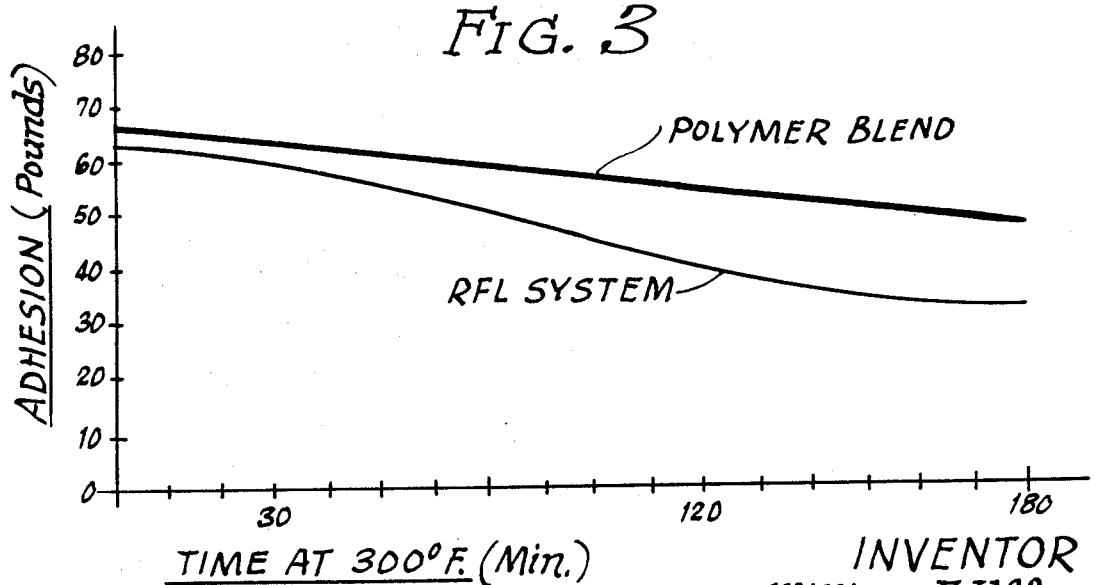
INVENTOR
William E. Uffner
by Staelin and Overman
Att'ys

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is intended to mean and include natural rubber in the cured or uncured stage, vulcanized or unvulcanized stage, and synthetic organic elastomeric materials such as styrene, nitriles, acrylics and esters and terpolymers thereof with styrene and acrylonitriles; styrene and vinyl pyridine, and EPDM rubbers as represented by butadiene polymers and copolymers with monoolefins such as butadiene-styrene copolymer, butadiene-acrylonitrile copolymers, butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2-12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth rod-like members and in part from the fact that the glass fiber surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

One of the compositions which has been found to be particularly useful in the treatment of individual glass fibers or in the impregnation of bundles of glass fibers as outlined above is described in U.S. Pat. No. 3,567,671, in which description is made of a treating composition formulated to include a resorcinol-aldehyde resin, a butadiene-styrene-vinyl pyridine terpolymer, a latex component in the form of a copolymer of vinyl chloride and vinylidene chloride, a carboxylated butadiene-styrene copolymer and an acrylic resin and an incompatible wax. Compositions of the type disclosed are claimed in the foregoing application and have been improved as is described in copending application Ser. No. 136,698, filed Apr. 23. 1971, now U.S. Pat. No. 3,707,399, in which the latex component described above is replaced by a copolymer formed of at least 60 percent by weight vinylidene chloride. It is believed that the improved results stemming from the use of a copolymer having a higher vinylidene chloride content is due at least in part from the fact that the vinylidene chloride component in the polymer system is susceptible to thermal decomposition and oxidation to thereby initiate a free radical-type cross-linking reaction. The net effect of the use of such a vinylidene chloride copolymer is that the resulting treated glass fibers have improved resistance to high humidity conditions. As is described in the latter application, the use of such vinylidene chloride copolymers results in the formation of treated glass fibers having improved tensile and adhesion characteristics. In addition, compositions of the type described in the latter application facilitate high loading of the treating composition on the individual glass fiber surfaces or in a glass fiber bundle.

While the compositions disclosed in the foregoing applications represent distinct improvement in the art, they are nevertheless subject to certain disadvantages. As is described in both of the foregoing applications, best results are obtained when the treating compositions are aged prior to application to glass fibers. While the theory underlying the advisability of aging such compositions prior to use is not completely understood, it is known that aging times of 24 hours or higher frequently provide best results in terms of the adhesion characteristics of the treated glass fibers with respect to elastomeric materials with which the treated glass fibers are combined in the manufacture of glass fiber reinforced elastomeric products. In addition, it has also been found that glass fibers treated with compositions of the type described and claimed in the foregoing applications frequently lose their adhesive characteristics relative to elastomeric materials if the treated glass fibers are stored at higher temperatures prior to their use as reinforcement in elastomeric materials.

It is accordingly an object of the present invention to provide an improved composition for treating individual glass fibers, or preferably for treating bundles of glass fibers by impregnation to promote the bonding relationship of glass fibers with elastomeric material in the manufacture of glass fiber reinforced elastomeric products in which the treating composition does not require aging prior to use and in which the adhesive characteristcs of glass fibers treated with the composition remains relatively constant even though the treated fibers may be subjected to elevated temperatures during storage.

It is a related object of the invention to produce coated glass fibers and impregnated glass fiber bundles for use as reinforcement for elastomeric materials which are characterized by improved adhesion. These and other objects and advantages of the invention will appear more fully hereinafter, and for purposes of illustration, but not of limitation, embodiments of the invention are shown in the accompanying drawings in which:

FIG. 1 is a schematic illustration of a preferred method for the impregnation of a bundle of glass fibers in accordance with one concept of the invention;

FIG. 2 is a cross-sectional view of a bundle of glass fibers treated in accordance with the method schematically illustrated in FIG. 1;

FIG. 3 is a graph illustrating the improved results obtained in accordance with the practice of this invention; and, FIG. 4 is a cross-sectional view of glass fibers individually coated with the composition of this invention in accordance with another embodiment thereof.

The concepts of the present invention reside in an improved treating composition for the treatment of glass fibers to facilitate the bonding relationship between glass fibers and elastomeric material with which the glass fibers are combined in the manufacture of glass fiber reinforced elastomeric products which is formulated to include, as the essential ingredients, an acrylonitrile-butadiene-styrene terpolymer, a copolymer of vinyl chloride and vinylidene chloride and a butadiene-styrene-vinyl pyridine terpolymer. It has been unexpectedly found that a treating composition formulated to include the foregoing components need not be aged prior to use in the treatment of glass fibers to enhance the bonding relationship of the glass fibers with elastomeric materials, while providing comparable adhesion characteristics to the treated glass fibers in the subsequent combination of the glass fibers with elastomeric materials. In addition, it has been found that glass fibers treated with a composition formulated in accordance with this invention retain their adhesive characteristics when combined with elastomeric materials even though the treated glass fibers have been subjected to relatively high temperatures during storage.

The acrylonitrile-butadiene-styrene terpolymer component, which contributes materially to the adhesion of the resulting composition onto the perfectly smooth, non-porous hydrophilic glass fiber surfaces, can be employed in the composition at an amount within the range of 40-65 percent by weight, and preferably 45-60 percent by weight on a solids basis. Such terpolymers are well known to those skilled in the art and are more frequently commercially available in the form of a latex. Representative of suitable acrylonitrile-butadiene-styrene terpolymers which can be used in the practice of this invention include Firestone SR1594 and Firestone SR5814 as well as Firestone SR5815. Such terpolymers are generally formed by interpolymerizing a monomeric mixture containing 30 to 35 percent by weight butadiene, 35 to 55 percent by weight styrene and 20 to 35 percent by weight acrylonitrile, although these proportions can be subjected to considerable variation and are not critical to the practice of this invention.

As indicated, use is also made of a copolymer of vinyl chloride and vinylidene chloride. Any of a wide variety of such copolymers can be used in the practice of this invention although the preferred copolymer is a copolymer latex marketed by Dow Chemical Company under the designation of Dow Latex 874. This material is a latex of a copolymer containing about 80 percent vinyl chloride and about 20 percent vinylidene chloride. For best results, the amount of the copolymer of vinyl chloride and vinylidene chloride employed in the composition of this invention is an amount sufficient to provide a solids content of the copolymer within the range of 2-20 percent by weight, and preferably 5-15 percent by weight.

As the butadiene-styrene-vinyl pyridine terpolymer, use can be made of any of a variety of such terpolymers well known to those skilled in the art. Representative of the commercially available terpolymers include "Pliolite VP100" from Goodyear Tire and Rubber Company and the terpolymer available from General Tire and Chemical Company under the designation "Gentac," such as Gentac FS and Gentac 107. Gentac FS is a terpolymer having a relatively low Mooney viscosity within the range of 35-45, and Gentac 107 has a higher Mooney viscosity, normally within the range of 110-120. Since the Gentac 107 frequently provides a tougher coating on the glass fibers, it is frequently desirable to make use of this particular terpolymer in accordance with the practice of this invention. Such terpolymers are generally prepared by the interpolymerization of about 70 percent by weight butadiene, about 15 percent by weight styrene and about 15 percent by weight vinyl pyridine, although these percentages are not critical to the practice of the invention and can be varied within fairly wide limits. In general, use is made of the butadiene-styrene-vinyl pyridine terpolymer in an amount within the range of 20-50 percent by weight, and preferably 25-40 percent by weight on a solids basis in the treating composition.

The acrylonitrile-butadiene-styrene terpolymer, the vinyl chloride-vinylidene chloride copolymer and the butadiene-styrene-vinyl pyridine terpolymer are all compatible with each other and operate to cushion the fibers and fill the interstices between the fibers in a glass fiber bundle whereby the fibers constituting the bundle are capable of realignment in the direction of stress for maximizing the high strength properties of the glass fiber component. In addition, the components are also compatible with the elastomeric materials forming the continuous phase in which the glass fibers are distributed to thereby permit the treated glass fibers to be blended with the elastomeric material for advancement to a cured or vulcanized stage whereby the treated material becomes an integral part of the elastomeric phase in which the fibers are distributed to intertie the treated glass fibers with the elastomeric material.

The composition of this invention can be prepared simply by admixing the impregnant, whereby the composition is almost immediately available for use in the treatment of glass fibers since, as indicated above, no aging of the composition to insure optimum stability and adhesion of the glass fibers to the elastomeric material is necessary.

Having described the basic concepts of the invention, reference is now made to the following examples, which are provided by way of illustration, and not by way of limitation, of the practice of the invention in a composition and method for the treatment of individual glass fibers and the impregnation of bundles of glass fibers. As indicated above, in the practice of the present invention, the composition of the invention is formulated as an impregnant composition for the treatment of bundles of glass fibers with the intention of individually coating the fibers to protect the fibers against destruction by mutual abrasion while penetrating the glass fiber bundle to securely intertie the impregnated fiber bundle system with the continuous phase of an elastomeric material with which the bundles of impregnated fibers are combined in the manufacture of glass fiber reinforced elastomeric products. The individual glass fibers forming the bundle have been preferably, although not necessarily, previously sized in forming with a conventional glass fiber size composition.

EXAMPLE 1

Impregnation Composition

| | |
|---|---|
| 20 parts by wt. | Acrylonitrile-butadiene-styrene terpolymer latex (Firestone Latex SR1594-45% solids) |
| 3.5 parts by wt. | Vinyl chloride-vinylidene chloride copolymer latex (Dow Latex 874-50% by wt. solids) |
| 12.0 part by wt. | Butadiene-styrene-vinyl pyridine terpolymer(Pliolite VP100-41% by wt. solids) |

To the foregoing composition, water is added to provide a solids content within the range of 10–50 percent dry solids by weight. Impregnation of the glass fiber bundle with the aqueous composition of this example can be effected by any of a variety of known methods for the impregnation of glass fiber bundles. Referring specifically to FIG. 1 of the drawing, a strand 10 of glass fibers which have been preferably, although not necessarily, sized in forming is passed over a guide roller 12 for passage downwardly into an impregnant bath 14 containing the aqueous impregnant composition of this example. The bundle is then turned under a pair of rollers 16 to effect a sharp bend in the bundle which operates to open the bundle to facilitate more complete penetration of the aqueous impregnant composition in the bundle of sized fibers for complete impregnation of the bundle. The impregnated bundle is then raised from the bath for passage through a roller or die 18 which operates to remove excess impregnant composition from the bundle and to work the impregnant composition into the bundle. Thereafter, the endless bundle is advanced over roller 20 into a drying oven 22, preferably in the in the form of an air drying oven maintained at a temperature above ambient temperature, and preferably a temperature within the range of 150–550° F. to accelerate removal of the impregnant in the aqueous diluent and to set the impregnant in situ in the glass fiber bundle. Drying will occur in a relatively short time, generally ranging from 0.1 to 30 minutes depending somewhat on the temperature of drying. The resulting bundle is shown in cross section in FIG. 2 of the drawing. As can be seen from the figure, the bundle is formed of a plurality of individual glass fibers 40 having an optional size coating 42 on the surface thereof. The impregnant 44 completely penetrates the bundle and serves to separate the fibers each from the other and form a unitary bundle structure.

To illustrate the results obtained with the use of the composition of this invention, reference is made to FIG. 3 of the drawings which is a plot of the adhesion characteristics of glass fibers treated in accordance with the present invention as compared to the adhesion characteristics of glass fibers treated with a composition of the type disclosed in U.S. Pat. No. 3,567,671. In testing the bundles of impregnated glass fibers treated in accordance with the present invention, the bundles of glass fibers are formed into test samples by molding between two strips of rubber. Thereafter, the test samples are stored at varying periods of time at 300° F. and then are allowed to cool to room temperature. The adhesion of the fibers is determined by measuring the force necessary to pull the glass fiber bundle from between the strips of rubber.

As can be seen from FIG. 3, the fibers treated with the composition of this invention retain their adhesion characteristics with respect to elastomeric materials even though they are aged for as long as 180 minutes at 300° F., whereas fibers treated with the composition described in the aforementioned copending application rapidly lose their adhesion characteristics on storage at such temperatures.

Additional impregnating compositions employed in the concept of this invention may be formulated as follows.

EXAMPLE 2

| | |
|---|---|
| 47.5 parts by wt. | Acrylonitrile-butadiene-styrene terpolymer (45% solids) |
| 28.0 parts by wt. | Butadiene-styrene-vinyl pyridine terpolymer(Gentac 107-42% by wt. solids) |
| 8.4 parts by wt. | Vinyl chloride-vinyldiene chloride copolymer latex (50% by wt. solids) |

To the foregoing materials, water is added to an impregnant composition having the described solids content, and the resulting composition can be employed in the treatment by impregnation of bundles of fibers in accordance with the procedure described in Example 1.

More complete protection for the individual glass fibers and more complete coordination of the glass fibers with the elastomeric material constituting the continuous phase can be achieved when impregnating compositions of the type described above are modified for use as a size composition for application to individual glass fiber filaments, preferably in forming. For this purpose, treating compositions of the type described above are further diluted with water to provide a solids content within the range of 5–30 percent weight and are formulated to include a glass fiber anchoring agent. Representative of suitable anchoring agents which can be used in the practice of this invention are the organo silicons, their hydrolysis products and polymerizaton products (polysiloxane) of an organo silane having the formula:

wherein Z is a readily hydrolyzable group such as alkoxy having 1-4 carbon atoms (e.g., methoxy, ethoxy, propoxy, etc.) or halogen, such as chlorine, $n$ is an integer from 1 to 3, and $R$ is hydrogen or an organic group in which at least one $R$ group is an alkyl group having 1-10 carbon atoms, such as methyl, ethyl, propyl, etc.; alkenyl having 1-10 carbon atoms, such as vinyl, allyl, etc.; cycloalkyl having 4-8 carbon atoms, such as cyclopentyl, cyclohexyl, etc.; aryl having 6-10 carbon atoms, such as phenyl, naphthyl, benzyl, etc.; alkoxy alkyl, such as methyloxyethyl, etc.; alkenylcarbonyloxyalkyl, such as carbonylpropylmethoxy, etc.; as well as the amino, epoxy, mercapto and halogen derivatives of the foregoing groups.

Illustrative of suitable silanes are ethyltrichlorosilane, propyltrimethoxy silane, vinyl trichlorosilane, allyl triethoxy silane, cyclohexylethyltrimethoxy silane, phenyl trichloro silane, phenyl dimethoxy silane, methacryloxypropyltrimethoxy silane, gamma-aminopropyltriethoxy silane, beta-aminovinyldiethoxy silane, N-(gamma-triethoxysilylpropyl)propylamine, gamma-aminoallyltriethoxy silane, para-aminophenyltriethoxy silane, N-beta-aminoethyl)-gamma-aminopropyltrimethoxy silane, gamma-chloropropyltrichlorosilane, glycidoxy propyltrimethoxy silane, 2,4-epoxycyclohexylethyltrimethoxy silane, gamma-mercaptopropyltrimethoxy silane as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atom, and in which the carboxylato group may also contain an amino group or an epoxy group. Suitable Werner complex compounds include stearato chromic chloride, methacrylato chromic chloride, aminopropylato chromic chloride, glycine chromic complex or glycylato chromic chloride.

The anchoring agents of the type described above are normally employed in an amount within the range of 0.1 to 5% by weight of the treating composition.

A forming size embodying the concepts of this invention can be formulated as follows:

EXAMPLE 3

| | |
|---|---|
| 40 – 65 parts by wt. | Acrylonitrile-butadiene-styrene terpolymer |
| 2 – 20 parts by wt. | Vinyl chloride-vinylidene chloride copolymer latex |
| 20 – 50 parts by wt. | Butadiene-styrene-vinyl pyridine terpolymer |
| 0.1 – 5 parts by wt. | Anchoring agent |

EXAMPLE 4

| | |
|---|---|
| 45 – 60 parts by wt. | Acrylonitrile-butadiene-styrene terpolymer |
| 5 – 15 parts by wt. | Vinyl chloride-vinylidene chloride copolymer latex |
| 25 – 40 parts by wt. | Butadiene-styrene-vinyl pyridine terpolymer |
| 0.1 – 5 parts by wt. | Anchoring agent |

The solids of the foregoing examples are formulated in the manner described in Examples 1-4 with the exception that the anchoring agent, such as gamma-aminopropyltriethoxy silane, is added to the system after hydrolyzation in aqueous medium as by use of a quaternary ammonium hydroxide such as tetraethanol ammonium hydroxide or tetramethyl ammonium hydroxide and that the amount of water is increased for dilution of the solids to an amount within the range of 5-30 percent by weight. When applied as a size, it is possible to achieve a higher loading because of the individual coating of the glass fiber surfaces such that loading in the amount of 15-40 percent by weight of the sized glass fibers is possible.

The following is a specific example of the formulation to provide a size composition.

EXAMPLE 5

| | |
|---|---|
| 55 parts by wt. | Acrylonitrile-butadiene-styrene terpolymer |
| 12 parts by wt. | Vinyl chloride-vinylidene chloride copolymer latex |
| 35 parts by wt. | Butadiene-styrene-vinyl pyridine terpolymer |
| 1 part by wt. | Gamma-aminopropyltriethoxy silane |

Size compositions of the type illustrated in Examples 3, 4 and 5 can be applied in any of a variety of conventional methods. The resulting fibers are shown in FIG. 4 of the drawing as formed with a coating 42 of the size composition on the surfaces of the individual glass fibers 40.

When the glass fibers are sized in forming with a composition embodying the modification of this invention, the sized glass fibers remain sufficiently non-tacky for processing directly into yarns, strands, cords or fabrics for use in the combination with the continuous phase elastomer.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and cure under heat and pressure or by vulcanization for advancement of the elastomeric materials to a cured or vulcanized state while in combination with the treated glass fibers whereby the bundles of glass fibers become strongly integrated with the elastomeric material in the glass fiber-elastomeric product.

It will be understood that the size compositions, represented by Examples 3 to 5, may also be employed as impregnating composition, preferably with a lesser dilution by aqueous medium. The anchoring agent will continue to operate to facilitate the bonded relationship or integration between the elastomeric material of the glass fiber treating composition and the glass fiber surfaces.

It will be apparent from the foregoing that I have provided a new and improved composition for use in the treatment of glass fibers and preferably bundles formed thereof to enhance their utilization with elastomeric materials, even under conditions of high humidity, in the manufacture of glass fiber-elastomeric products while still retaining the desired degree of non-tackiness to enable the treated glass fiber bundle to be processed in substantially the conventional manner into cords, yarns or fabrics or other arrangements desired for use in the final product.

It will be understood that invention exists not only in the compositions described but also in the process in which the compositions are employed in the treatment It will be understood that changes may be made in the details of formulation and methods of preparation without departing from the spirit of the invention, especially as defined in the following claims.

I claim:

1. A glass fiber bundle comprising a plurality of glass fibers and an impregnant in the bundle, the impregnant consisting essentially of 40–65 parts by weight of an acrylonitrile-butadiene-styrene terpolymer, 2 to 20 parts by weight of a copolymer of vinyl chloride and vinylidene chloride and 20 to 50 parts by weight of a butadiene-styrene-vinyl pyridine terpolymer.

2. A glass fiber bundle as defined in claim 1 wherein the bundle is formed of a strand of a plurality of individual glass fiber filaments gathered together.

3. A glass fiber bundle as defined in claim 1 wherein the bundle is formed of a plurality of strands of individual glass fiber filaments plied together.

4. A glass fiber bundle as defined in claim 3 wherein one or more of the strands forming the bundle are twisted prior to assembly of the bundle.

5. A glass fiber bundle as defined in claim 1 wherein the bundle is in the form of a woven or non-woven fabric formed of strands of individual glass fiber filaments.

6. Glass fibers having a coating on the surfaces thereof, said coating consisting essentially of 40 to 65 parts by weight of an acrylonitrile-butadiene-styrene terpolymer, 2 to 20 parts by weight of a copolymer of vinyl chloride and vinylidene chloride and 20 to 50 parts by weight of a butadiene-styrene-vinyl pyridine terpolymer.

7. In a glass fiber-reinforced elastomeric product in which an elastomeric material constitutes a continuous phase in which the glass fibers are distributed, the improvement in the bonding relationship between the glass fibers and the elastomeric material comprising a coating on the glass fibers consisting essentially of 40 to 65 parts by weight of an acrylonitrile-butadiene-styrene terpolymer, 2 to 20 parts by weight of a copolymer of vinyl chloride and vinylidene chloride and 20 to 50 parts by weight of a butadiene-styrene-vinyl pyridine terpolymer.

8. A product as defined in claim 7 wherein the glass fibers are distributed in the elastomeric material in the form of individual filaments and the coating is a coating on the surfaces of the filaments.

9. A product as defined in claim 7 wherein the glass fibers are distributed in the elastomeric material in the form of bundles of glass fibers and the coating is an impregnant in the bundle.

10. A product as defined in claim 9 wherein the glass fibers forming the bundle have a thin size coating on the surfaces thereof.

11. A glass fiber bundle as defined in claim 1 wherein the individual glass fibers forming the bundle have a thin size coating on the surfaces thereof.

* * * * *